United States Patent
Pan et al.

(10) Patent No.: US 11,662,730 B2
(45) Date of Patent: May 30, 2023

(54) HIERARCHICAL PATH DECISION SYSTEM FOR PLANNING A PATH FOR AN AUTONOMOUS DRIVING VEHICLE

(71) Applicant: Baidu USA LLC, Sunnyvale, CA (US)

(72) Inventors: Jiacheng Pan, Sunnyvale, CA (US); Yifei Jiang, Sunnyvale, CA (US); Yajia Zhang, Sunnyvale, CA (US); Jiaming Tao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 428 days.

(21) Appl. No.: 16/458,853

(22) Filed: Jul. 1, 2019

(65) Prior Publication Data
US 2021/0004010 A1    Jan. 7, 2021

(51) Int. Cl.
*G05D 1/02*      (2020.01)
*G08G 1/16*      (2006.01)
*G05D 1/00*      (2006.01)
*H04L 67/12*     (2022.01)

(52) U.S. Cl.
CPC ......... *G05D 1/0214* (2013.01); *G05D 1/0088* (2013.01); *G08G 1/167* (2013.01); *G05D 2201/0213* (2013.01); *H04L 67/12* (2013.01)

(58) Field of Classification Search
CPC ............... G05D 1/0088; G05D 1/0214; G05D 2201/0213; B60W 30/18163; H04L 67/12; H04L 67/18; G08G 1/167
See application file for complete search history.

(56) References Cited

U.S. PATENT DOCUMENTS

| | | | |
|---|---|---|---|
| 8,838,321 B1* | 9/2014 | Ferguson | G05D 1/0289 340/901 |
| 9,672,734 B1* | 6/2017 | Ratnasingam | H04W 4/44 |
| 2018/0082587 A1* | 3/2018 | Wan | B60W 50/14 |
| 2019/0008248 A1* | 1/2019 | Kovtun | G05D 1/0255 |
| 2019/0367021 A1* | 12/2019 | Zhao | B60W 60/0011 |
| 2019/0369616 A1* | 12/2019 | Ostafew | B60W 60/0027 |
| 2020/0398894 A1* | 12/2020 | Hudecek | G05D 1/0214 |
| 2021/0155242 A1* | 5/2021 | Taniguchi | B60W 30/18163 |

\* cited by examiner

*Primary Examiner* — Hunter B Lonsberry
*Assistant Examiner* — Matthew J. Reda
(74) *Attorney, Agent, or Firm* — Womble Bond Dickinson (US) LLP

(57) ABSTRACT

According to one embodiment, during a first planning cycle, a first lane boundary of a driving environment perceived by an ADV is determined using a first lane boundary determination scheme (e.g., current lane boundary), which has been designated as a current lane boundary determination scheme. A first trajectory is planned based on the first lane boundary to drive the ADV to navigate through the driving environment. The first trajectory is evaluated against a predetermined set of safety rules (e.g., whether it will collide or get too close to an object) to avoid a collision with an object detected in the driving environment. In response to determining that the first trajectory fails to satisfy the safety rules, a second lane determination boundary of the driving environment is determined using a second lane boundary determination scheme and a second trajectory is planned based on the second lane boundary to drive the ADV.

18 Claims, 11 Drawing Sheets

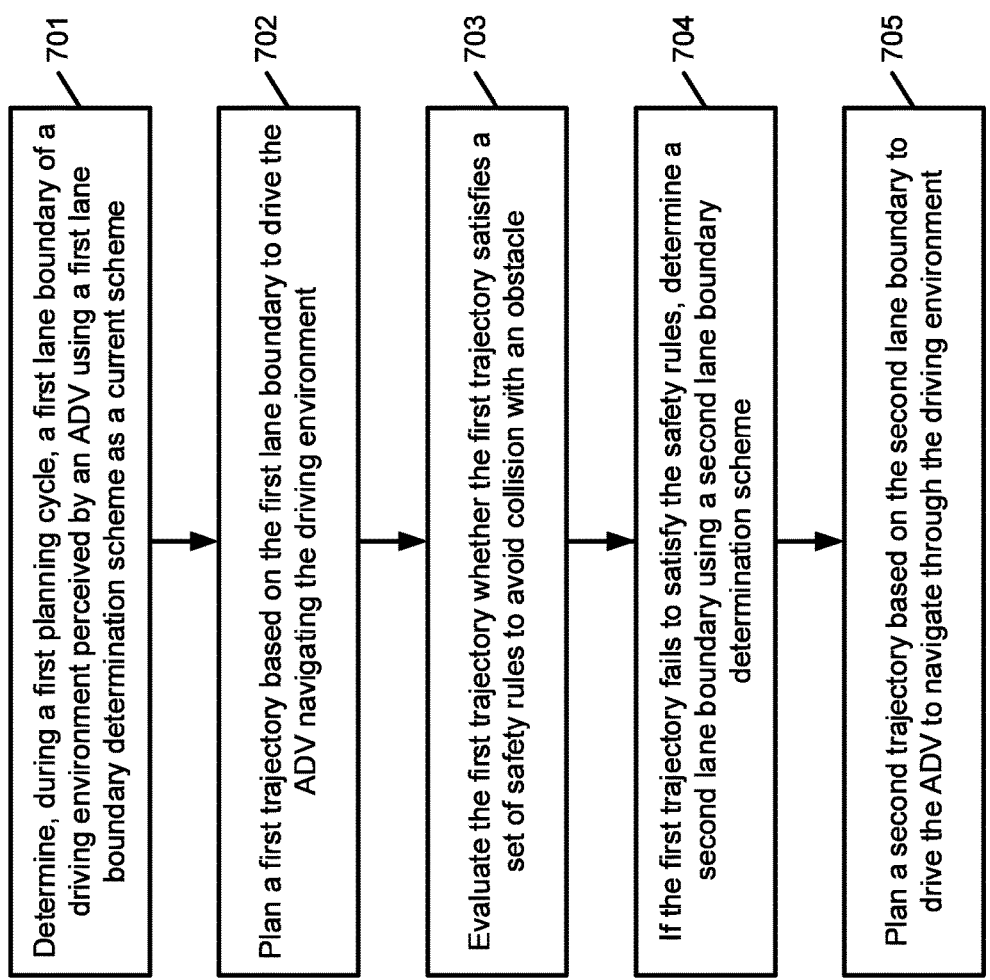

HIERARCHICAL PATH DECISION SYSTEM FOR PLANNING A PATH FOR AN AUTONOMOUS DRIVING VEHICLE

TECHNICAL FIELD

Embodiments of the present disclosure relate generally to operating autonomous vehicles. More particularly, embodiments of the disclosure relate to planning a path for an autonomous driving vehicle (ADV) using a hierarchical path decision system.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is also important to predict how other vehicles move in order to plan a path for the autonomous driving vehicle (ADV). A successful autonomous driving system needs to be able to handle any obstacle in a safe, agile and comfortable way. When it comes to obstacles that are slow or static, it is mainly the path-decision module's duty to provide a proper path to achieve the above goal.

An existing path decision module also tried to solve the above problem. However, it only supports simple scenarios. For example, the existing system can only side-pass fully-stopped vehicles. But when it starts to move during side-passing, the path-decision will get stalled. Also, in an urgent scenario, such as pedestrian suddenly steps onto a driveway, etc., the existing system can only do hard-brake, instead of proper dodging.

BRIEF DESCRIPTION OF THE DRAWINGS

Embodiments of the disclosure are illustrated by way of example and not limitation in the figures of the accompanying drawings in which like references indicate similar elements.

FIG. 7 is a flow diagram illustrating an example of a process for planning a path for autonomous driving according to one embodiment.

DETAILED DESCRIPTION

Figure 1:
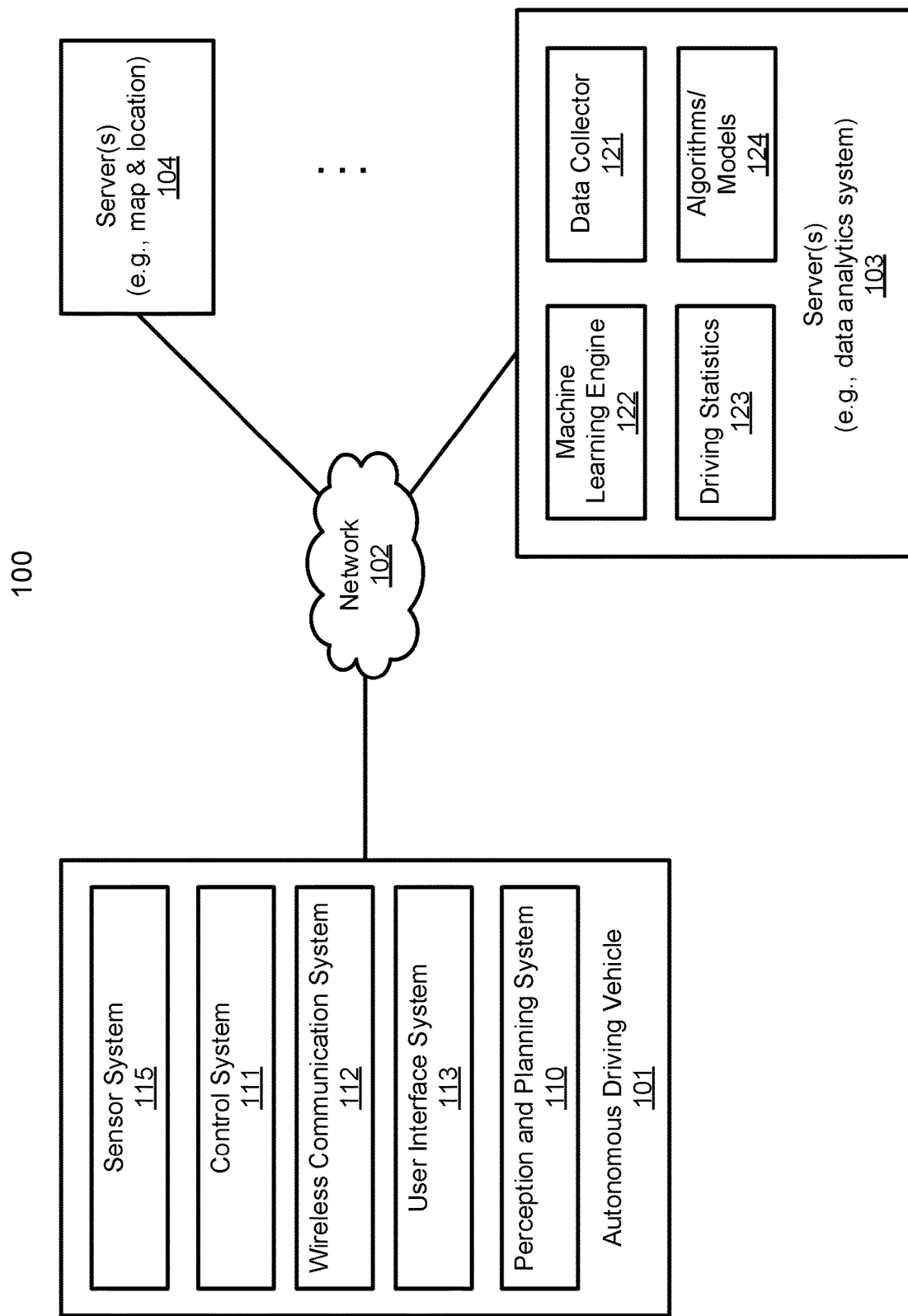
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a hierarchical lane boundary determination system is utilized to determine lane boundary for planning a path for an autonomous driving vehicle (ADV) under different driving circumstances. Through dynamic transitioning among different levels of lane boundary determination scheme in the hierarchy, the ADV can robustly handle a variety of driving situations.

According to one embodiment, during a first planning cycle, a first lane boundary of a driving environment perceived by an ADV is determined using a first lane boundary determination scheme (e.g., current lane boundary), which has been designated as a current lane boundary determination scheme. A first trajectory is planned based on the first lane boundary to drive the ADV to navigate through the driving environment. The first trajectory is evaluated against a predetermined set of safety rules (e.g., whether it will collide or get too close to an object) to avoid a collision with an object detected in the driving environment. In response to determining that the first trajectory fails to satisfy the safety rules, a second lane determination boundary of the driving environment is determined using a second lane boundary determination scheme and a second trajectory is planned based on the second lane boundary to drive the ADV.

In addition, according to one embodiment, the second lane boundary determination scheme is designated as the current lane boundary determination scheme, such that during a second planning cycle (e.g., next planning cycle), a subsequent trajectory can be planned based on a lane boundary determined based on the second lane boundary determination scheme as the current lane boundary determination scheme. In one embodiment, the first lane boundary determination scheme is based on a lane configuration of a current lane in which the ADV is located. The second lane boundary determination scheme is based on a lane configuration of the current lane and at least one adjacent lane. In another embodiment, the second lane boundary determination scheme is based on all lanes of the road having multiple lanes.

According to one embodiment, in evaluating the first trajectory, it is determined whether an obstacle is blocking or too close to the first trajectory (e.g., within a predetermined proximity of the first trajectory) and the obstacle is unlikely to move within a predetermined time period. The determination of whether the obstacle will likely move may be based on the moving history of the obstacle captured by the sensors of the ADV and perceived by the perception process of the ADV. In another embodiment, the determination may be based on whether there is an emergency vehicle is within a predetermined proximity of the ADV.

According to one embodiment, during a second planning cycle subsequent to the first planning cycle, a third trajectory is planned based on a lane boundary determined based on the first lane boundary determination scheme. The third trajectory is then evaluated to determine whether it satisfies the safety rules. If so, the first lane boundary determination scheme (e.g., default lane determination scheme) may be restored as the current lane boundary determination scheme. Thus, although it is not used during the second planning cycle, the third trajectory is still planned. However, it is used to determine whether the driving scenario has changed to determine whether the default lane boundary scheme can be restored in the subsequent planning cycles. In one embodiment, the default lane boundary scheme is restored only if there are consecutive numbers of successful trajectory planning using the default lane boundary determining scheme, while the current lane boundary determination scheme is not the default lane boundary determination scheme.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
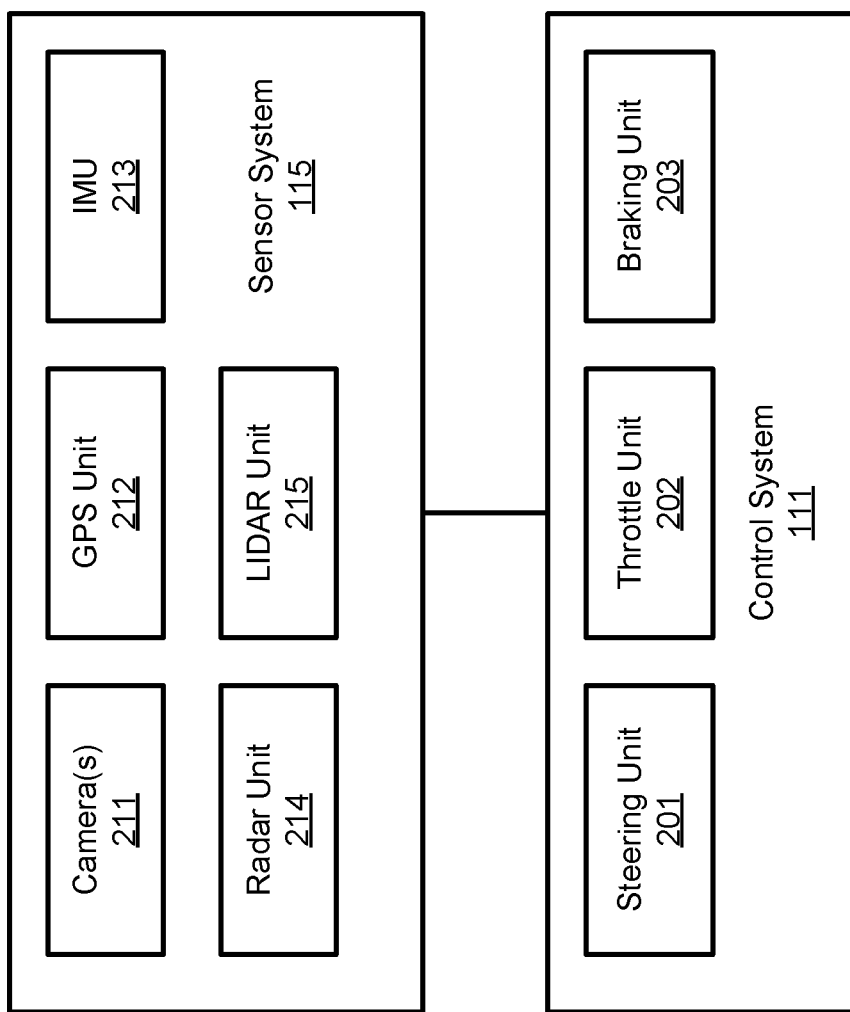
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include multiple lane boundary determination schemes in a hierarchical structure and an algorithm regarding how to transition amongst different lane boundary determination schemes. Algorithms 124 can then be uploaded on ADVs to be utilized during autonomous driving in real-time.

Figure 3A:
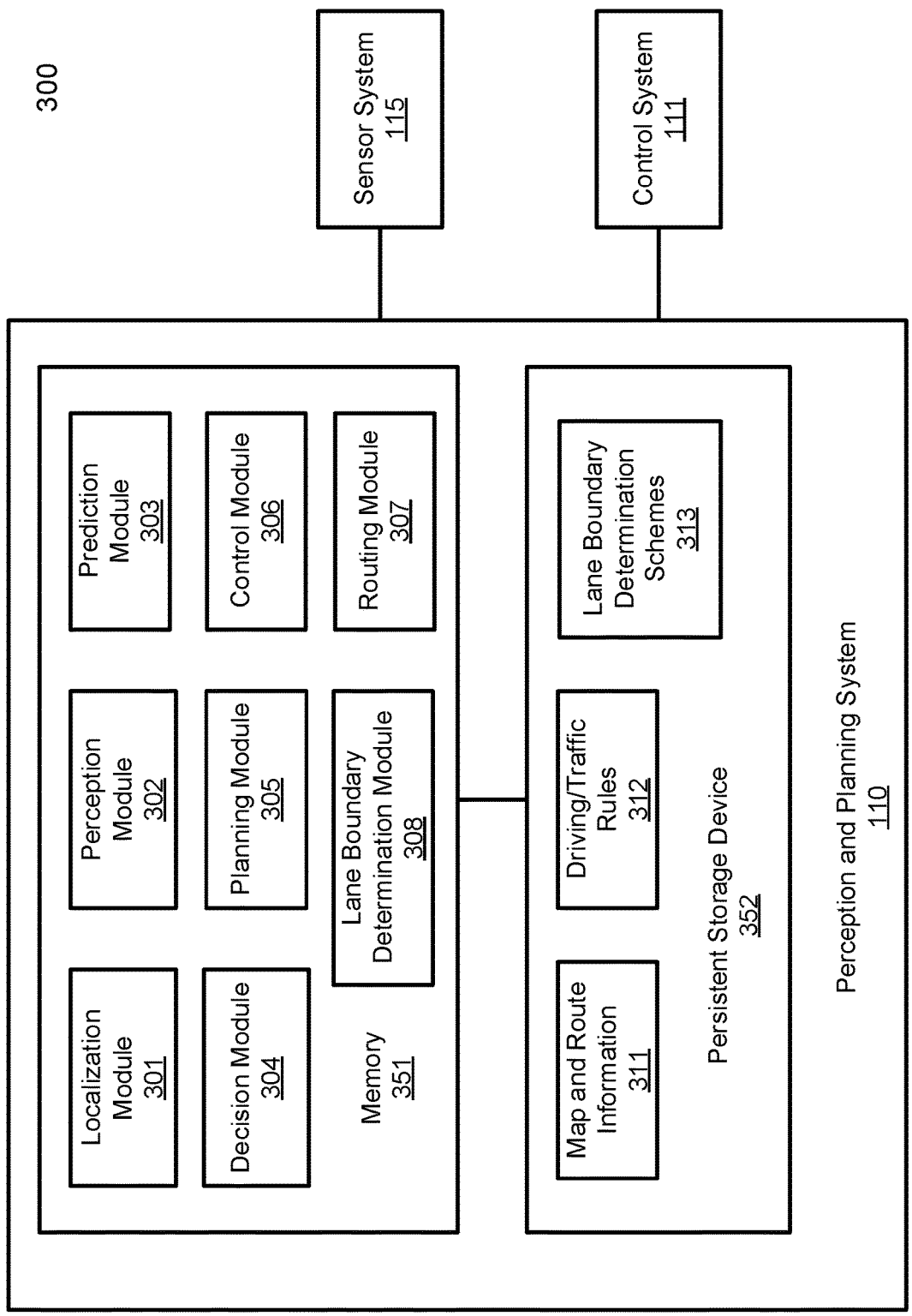
FIGS. 3A-3B are block diagrams illustrating an example of a perception and planning system used with an autonomous vehicle according to one embodiment.
Figure 3B:
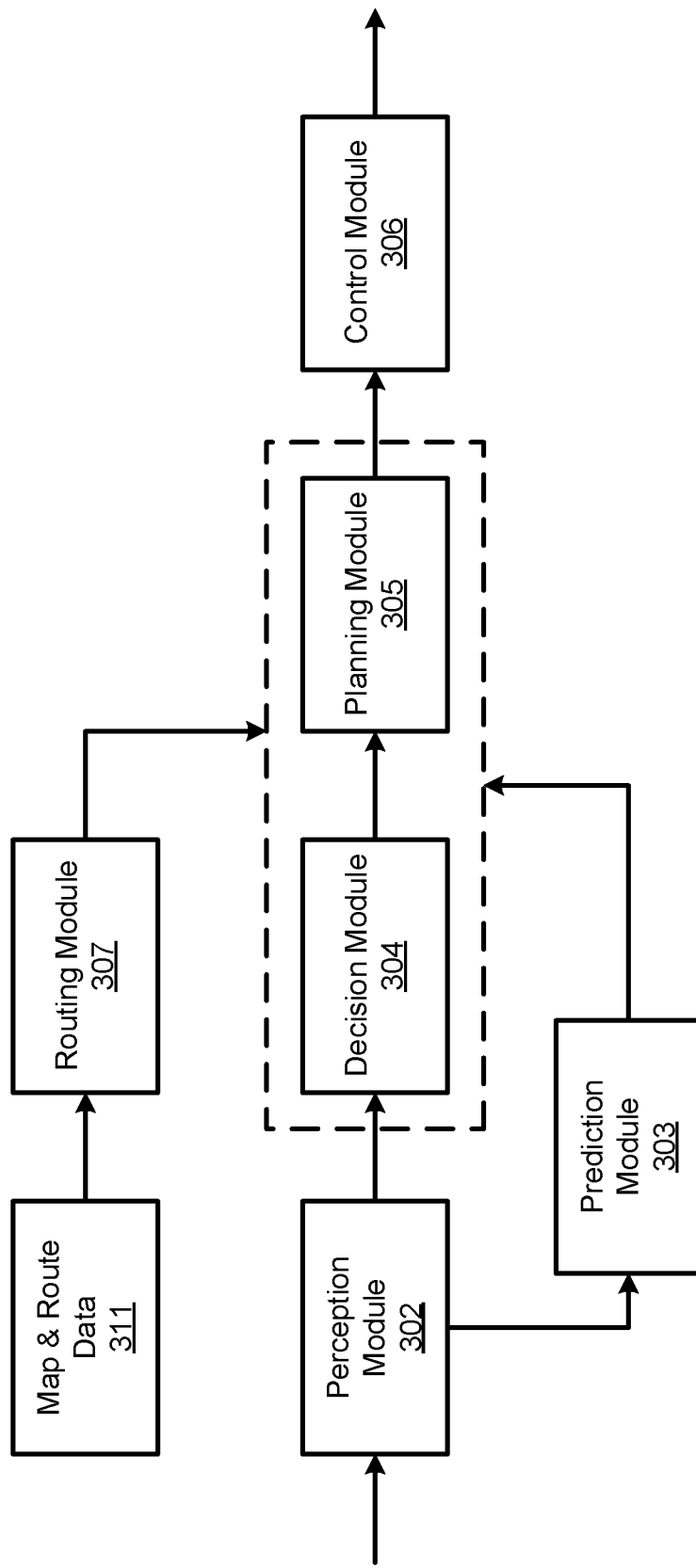
Figure 4:
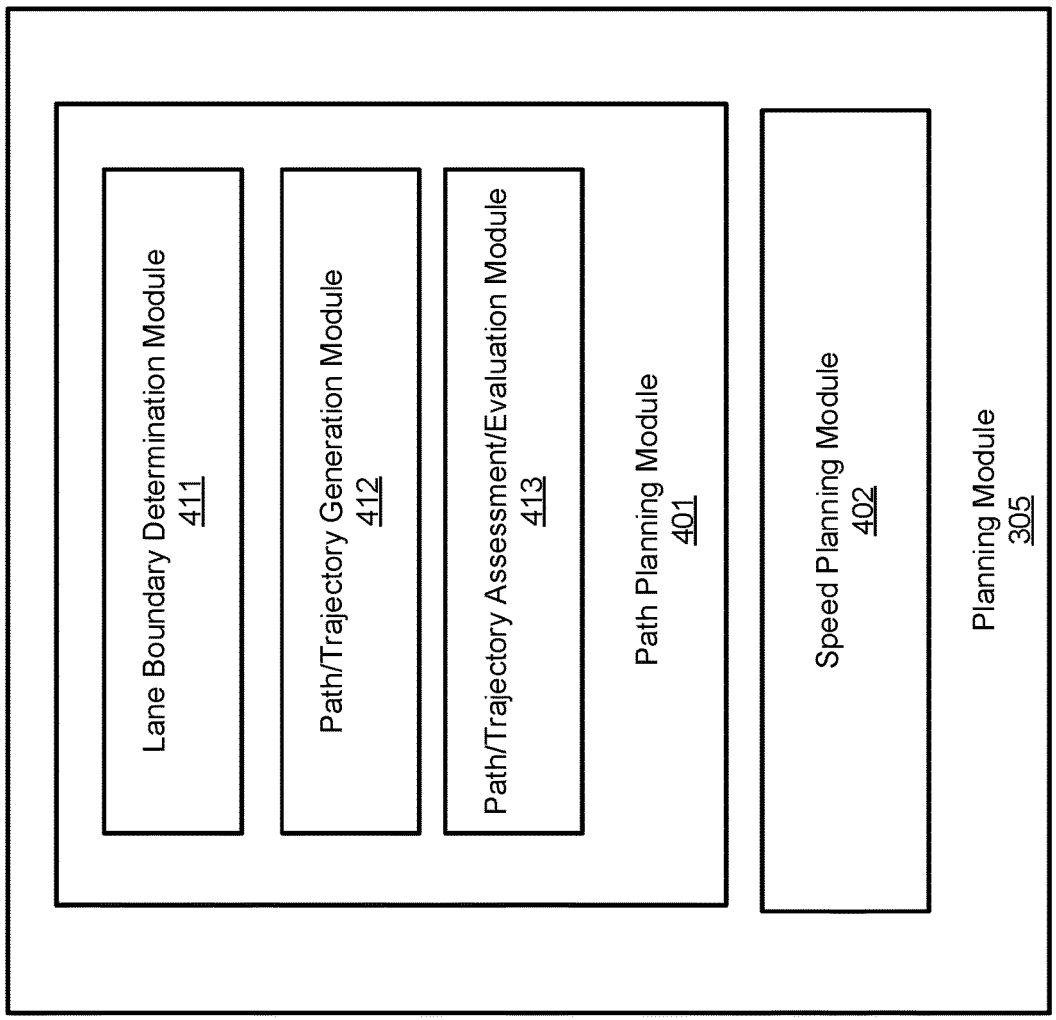
FIG. 4 is a block diagram illustrating an example of a planning module according to one embodiment.

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and lane boundary determination module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, lane boundary determination module 308 is configured to determine a lane boundary based on the current setting of the lane boundary determination schemes 313. The lane boundary may be utilized by planning module 305 to plan a path or trajectory to drive an ADV in view of the determined lane boundary. Lane boundary determination module 308 may be integrated as part of planning module 305. Dependent upon the planning result performed by planning module 305, lane boundary determination module 308 determines which of the lane boundary schemes 313 should be utilized to determine a lane boundary for subsequent path planning. For the purpose of illustration, the term of "path" and "trajectory" are interchangeable terms.

Figure 5:
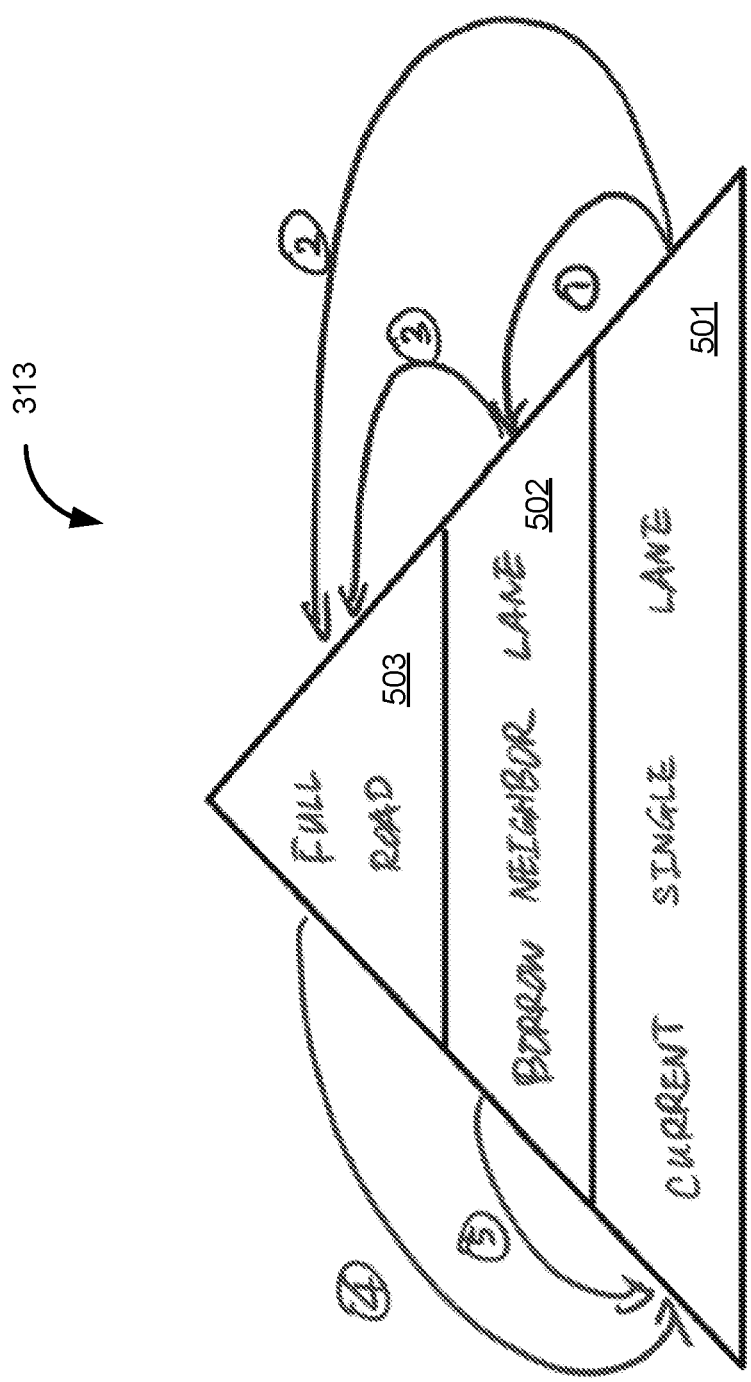
FIG. 5 is a block diagram illustrating a lane boundary determination scheme hierarchy according to one embodiment.

FIG. 5 is a block diagram illustrating an example of a planning module for autonomous driving according to one embodiment. Referring to FIG. 5, planning module 305 includes a path planning module 401 and a speed planning module 402. Path planning module 401 is configured to plan a trajectory based on the perception of the driving environment provided by perception module 302 and prediction of obstacles perceived provided by prediction module 303. For each trajectory point of the trajectory planned by path planning module 401, speed planning module 402 determines a speed of the trajectory point based on the perception and prediction.

According to one embodiment, path planning module 401 includes a lane boundary determination module 411, a path generation module 412, and a path assessment or evaluation module 413. In this example, lane boundary determination module 308 is integrated with planning module 305 to become a part of lane boundary determination module 411. In one embodiment, lane boundary determination module 411 is configured to determine a lane boundary based on the current setting of the lane boundary determination scheme and may also update the current lane boundary determination scheme based on the path planning result. Based on the lane boundary, path generation module 412 generates a trajectory based on the perception and prediction in view of the lane boundary determined by lane boundary determination module 411. The trajectory is evaluated by path assessment module 413 against a set of safety rules to determine whether the trajectory is valid. If the trajectory is valid, speed planning is performed on the trajectory by speed planning module 402.

FIG. 5 is a block diagram illustrating a boundary determination scheme hierarchical structure according to one embodiment. Referring to FIG. 5, lane boundary schemes are configured in a hierarchy structure including bottom level 501, middle level 502, and top level 503. Note that although three levels are shown, more or fewer levels may also be implemented. In one embodiment, bottom level 501 is configured as a default level, where in a normal driving situation, a lane boundary may be determined based on a lane boundary determination scheme corresponding to bottom level 501. However, in response to certain specific driving scenarios, the selection of the lane boundary schemes may transition from bottom level 501 to middle level 502 or top level 503. Similarly, while at top level 503 or middle level 502, the selection may also transition back down to bottom level 501 in response to certain situations.

According to one embodiment, when selecting a boundary determination scheme at the bottom level 501, only the current lane in which the ADV is located is utilized as a single lane to determine the lane boundary for path planning. At middle level 502, the current lane plus at least an adjacent lane may be utilized to determine a lane boundary for path planning. At top level 503, all lanes of the road may be utilized for path planning. Given a lane boundary selected based on a particular lane boundary determination scheme, path generation module 412 attempts to generate a path within the selected lane boundary. When a path has been planned, as described above, if the path is not valid due to a failure to satisfy a safety rule, boundary determination scheme of bottom level 501 may not be appropriate. Rather, middle level 502 or top level 503 may be selected dependent upon the specific circumstances.

For example, if a path planned based on a lane boundary determined based on a lane boundary determination scheme of bottom level 501 is blocked by another obstacle and the obstacle is unlikely to move within a predetermined time period, the selection of lane boundary scheme may transition from bottom level 501 to middle level 502. If the current lane boundary determination scheme is bottom level 501 or middle level 502, and there is an emergency vehicle appears nearby, the selection of lane boundary determination scheme may switched from the bottom level 501 or middle level 502 to the top level 503. The rationale is that when an emergency vehicle is present, every vehicle on the street has to yield to the side or a safe space to allow the emergency vehicle to pass through. As a result, all lanes are considered to plan a path to safely stop and park the ADV. Similarly, if the current level is at top level 503 or middle level 502, and if the special situation that caused the transition from a lower level to a higher level no longer exists, the selection of lane boundary determination schemes may transition back down to the bottom level 501 as a default level.

According to one embodiment, while at levels 502 and 503, in addition to plan a path using the corresponding lane boundary determination schemes, an additional path is planned using the default lane boundary determination scheme of bottom level 501. However, the additional path is not used for driving the ADV. Rather, the additional path is utilized to determine whether the special situation that warrants the top level 503 and middle level 502 still exist. In one embodiment, if it is determined the additional path satisfies the safety rules, the current lane boundary determination scheme may switch back down to the default level 501.

Thus, for each planning cycle, a path is planned using the currently selected lane boundary determination scheme, which can be one of the levels 501-503 dependent upon driving situation. If the current level is not the default bottom level 501, an additional path is planned, although the additional path is not utilized for autonomous driving. If the additional path satisfies the safety rules, the current lane boundary determination scheme may be set back to the default level 501, so that the default lane boundary determination scheme will be utilized during the next planning cycle. In one embodiment, in order to reduce the possibility of false positive, the restoration of the default lane boundary determination scheme is performed only if the additional path has been successfully planned for a predetermined consecutive numbers of planning cycles.

Figure 6A:
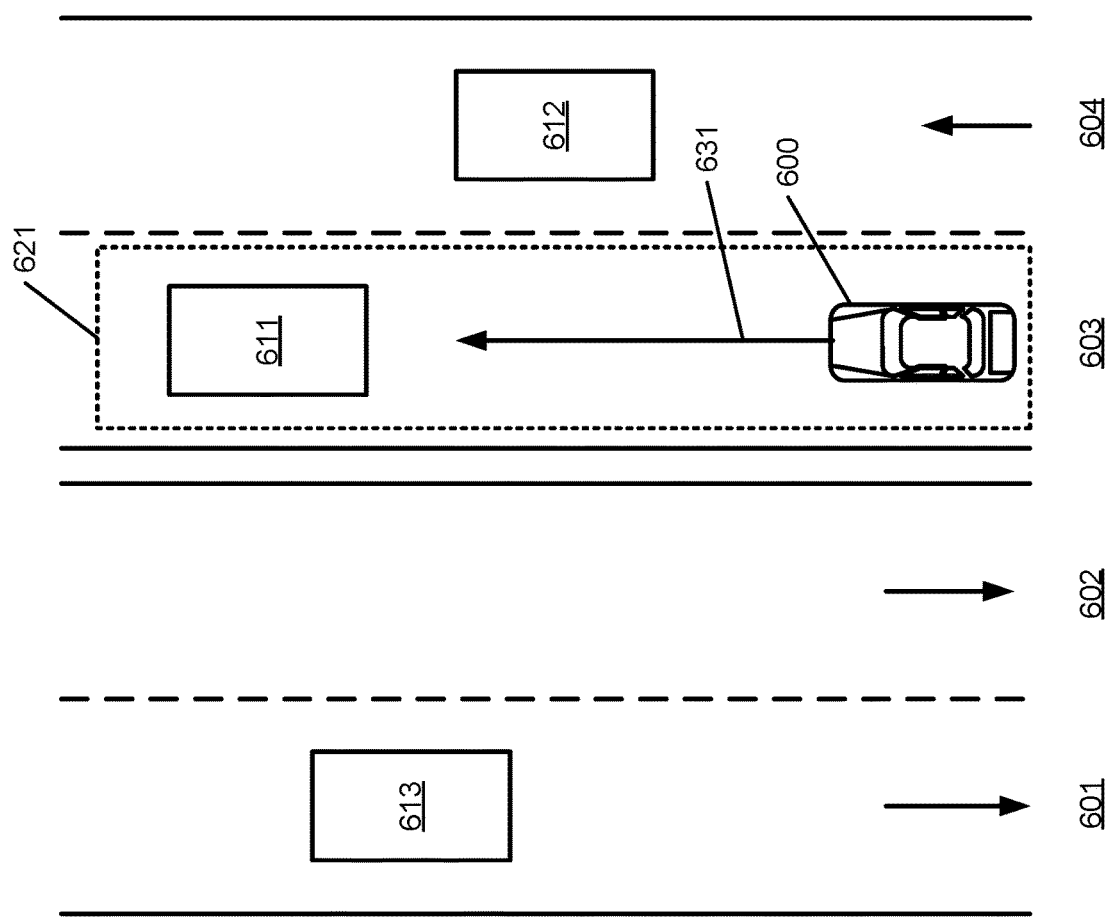
FIGS. 6A-6C are block diagram illustrating a process of planning a path using a proper lane boundary according to one embodiment.
Figure 6B:
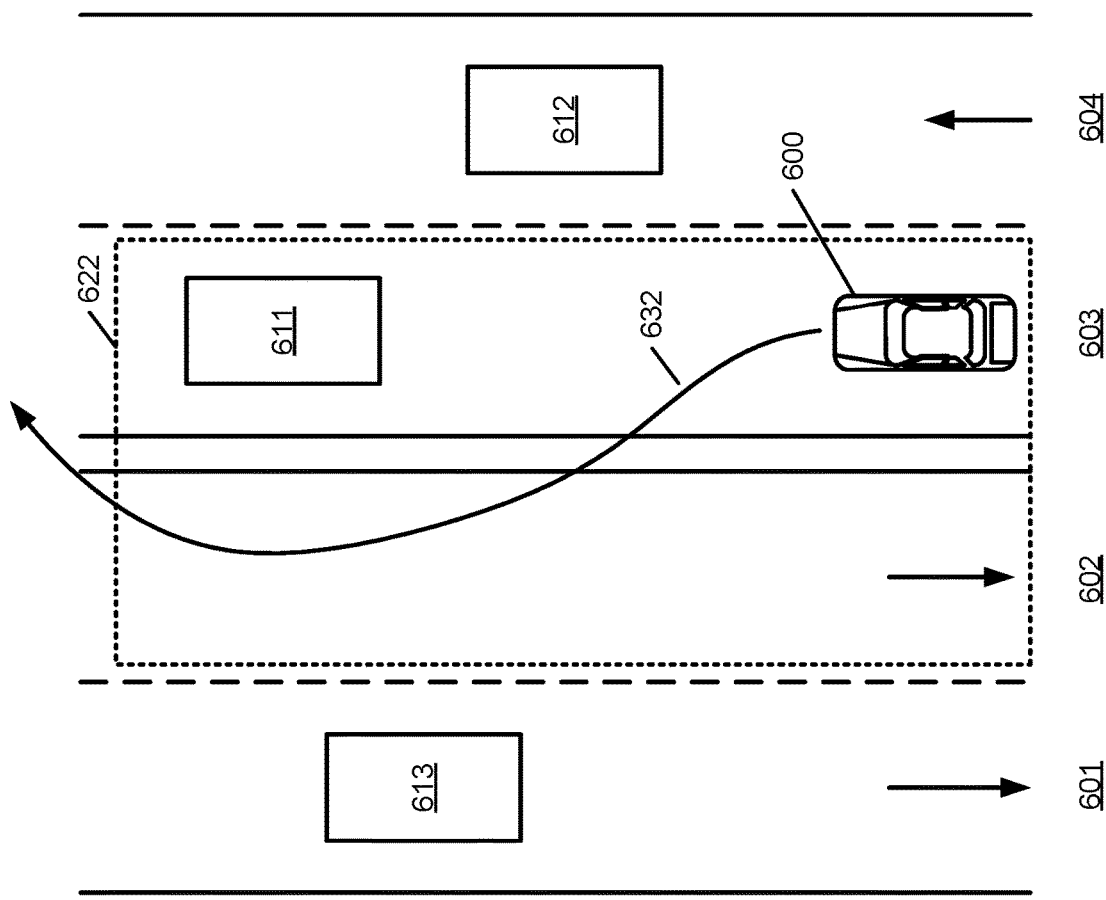
Figure 6C:
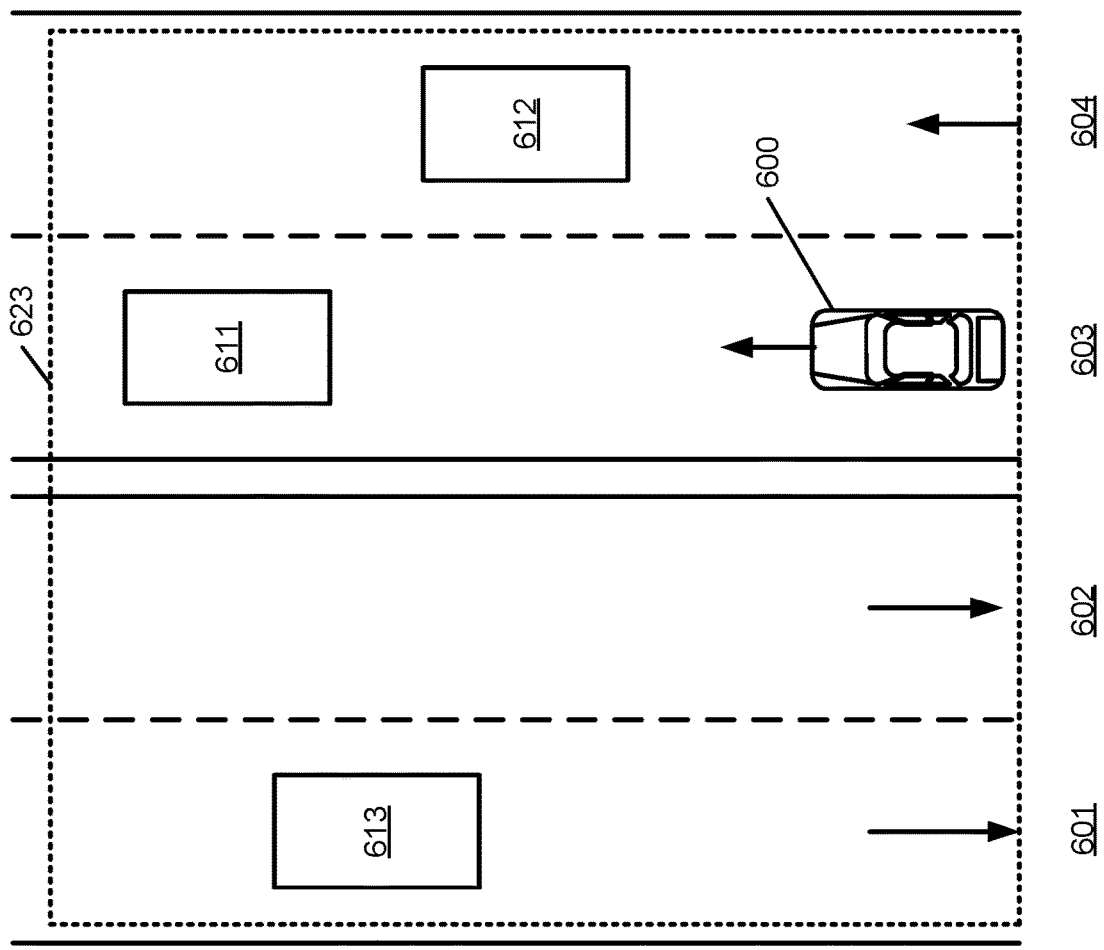

Referring now to FIG. 6A, in this example, there are four lanes 601-604, where lanes 601-602 are on an opposite direction of lanes 603-604. ADV 600 is currently on lane 603. In addition, obstacles 611-613 have been detected. Initially by default, lane boundary 621 is determined based on the default lane boundary determination scheme, i.e., bottom level 501 using the current lane as a single lane. A path 531 is planned and due to obstacle 611, path 531 cannot satisfy the safety rules because path 531 has been blocked by obstacle 611. As a result, an upper level of lane boundary determination scheme is utilized, i.e., level 502. Under the lane boundary determination scheme corresponding to level 502, the current lane and at least one adjacent lane can be utilized in planning path. In this example, lane 602 is considered in determining a lane boundary 622 as shown in FIG. 6B and a path 632 can be planned to avoid collision with obstacle 611. Under an emergency situation, all lanes 601-604 can be utilized in determining a lane boundary 623 for path planning as shown in FIG. 6C.

FIG. 7 is a flow diagram illustrating a process of path planning of autonomous driving according to one embodiment. Process 700 may be performed by processing logic which may include software, hardware, or a combination thereof. For example, process 700 may be performed by planning module 305. Referring to FIG. 7, at block 701, during a first planning cycle, processing logic determines a first lane boundary of a driving environment perceived by an ADV using a first lane boundary determination scheme designated a current lane boundary determination scheme (e.g. a default scheme at level 501). At block 702, processing logic plans a first trajectory based on the first lane boundary to drive the ADV navigating through the driving environment. At block 703, the first trajectory is evaluated against a set of safety rules to avoid a collision with an object detected in the driving environment. If the first trajectory fails to satisfy the safety rules, at block 704, a second lane boundary determined using a second lane boundary determination scheme (e.g., lane boundary determination scheme at level 502 or 503). At block 705, a second trajectory is planned in view of the second lane boundary.

Figure 8:
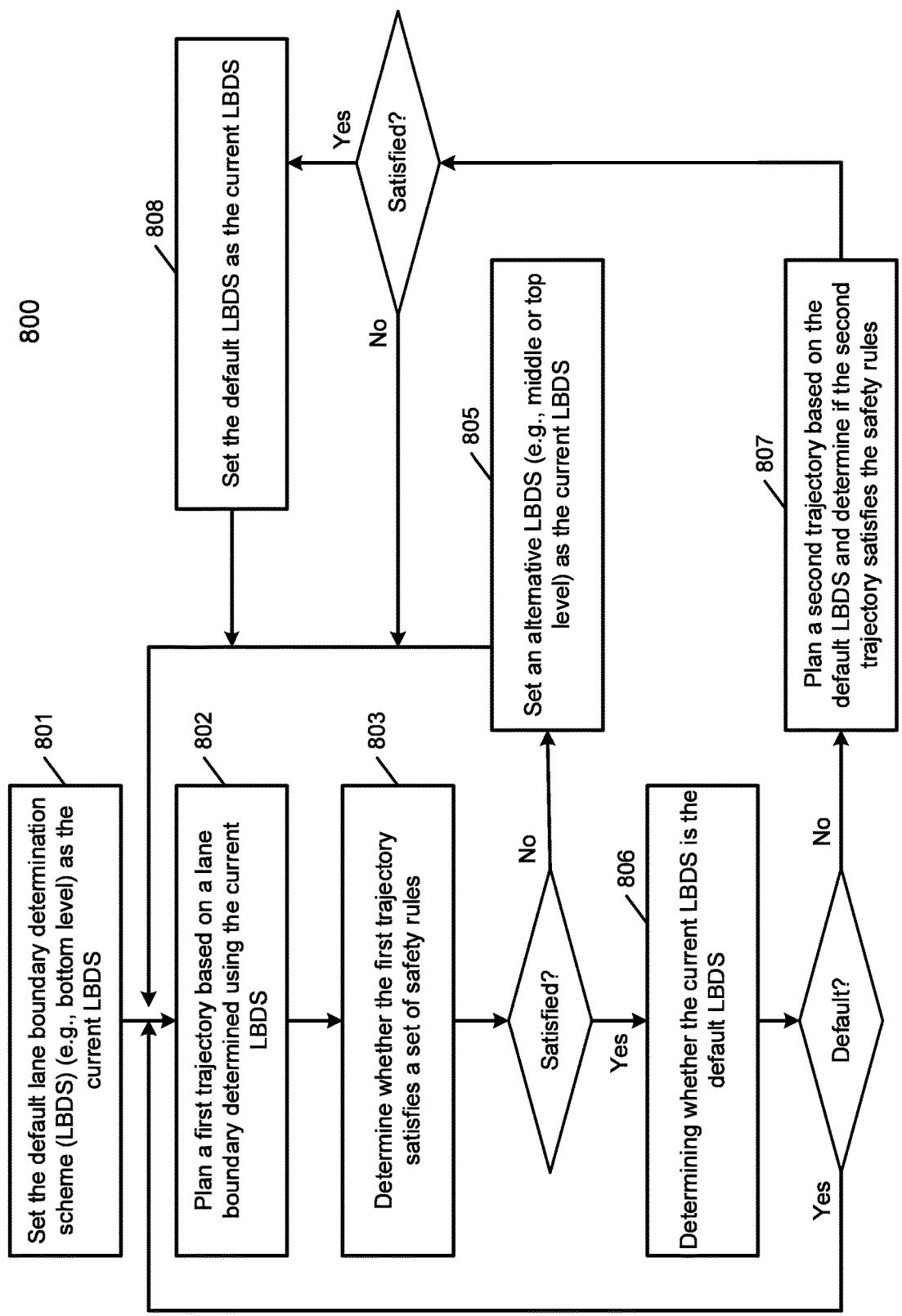
FIG. 8 is a flow diagram illustrating an example of a process for planning a path for autonomous driving according to one embodiment.

FIG. 8 is a flow diagram illustrating an example of a process for planning a path for autonomous driving according to one embodiment. Process 800 may be performed by processing logic which may include software, hardware, or a combination thereof. For example, process 800 may be performed by planning module 305 during a particular planning cycle. Referring to FIG. 8, at block 801, the current lane boundary determination scheme (LBDS) is initially set to the default LBDS (e.g., bottom level LBDS 501). At block 802, processing logic plans a first trajectory based on a lane boundary determined using the current LBDS. At block 803, processing logic determines whether the first trajectory satisfies a set of safety rules.

If the first trajectory fails to satisfy the safety rules, at block 805, an alternative LBDS (e.g., middle level 502 or top level 503 of LBDS) is set to the current LBDS. As a result, the alternative LBDS will be utilized to plan a trajectory during the next planning cycle. At the current planning cycle, since the first trajectory fails to satisfy the safety rules, the last successfully planned trajectory during a previous planning cycle will be utilized instead.

If the first trajectory satisfies the safety rules at block 803, at block 806, it is determined whether the current LBDS is the default LBDS. As described above, during a particular planning cycle, the current LBDS may be at any level of LBDS levels as shown in FIG. 5 and described above. If the current LBDS is not the default LBDS (e.g., middle or top level of LBDS), at block 807, a second trajectory is planned using the default LBDS and the second trajectory is examined against the safety rules. As described above, the second trajectory is not utilized to drive an ADV; rather, the second trajectory is utilized to determine whether the default LBDS should be restored as the current LBDS. If it is determined that the second trajectory satisfies the safety rules, at block 808, the default LBDS is restored as the current LBDS for the next planning cycle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   determining, during a first planning cycle, a first lane boundary of a driving environment perceived by the ADV using a first lane boundary determination scheme designated as a current lane boundary determination scheme;
   planning a first trajectory based on the first lane boundary to drive the ADV navigating through the driving environment;
   evaluating whether the first trajectory satisfies a set of safety rules to avoid a collision with an object detected in the driving environment, comprising determining that the object is blocking the first trajectory and determining whether the object is to move out of the first trajectory within a predetermined period of time, in response to determining that the object is not to move out of the first trajectory within the predetermined period of time, deeming that the first trajectory fails to satisfy the set of safety rules; and in response to determining that the first trajectory fails to satisfy the set of safety rules, determining a second lane boundary of the driving environment using a second lane boundary determination scheme which is based on a lane configuration of all lanes of a road in which the ADV is driving, and planning a second trajectory based on the second lane boundary;

controlling the ADV in accordance with the second trajectory during a second planning cycle subsequent to the first cycle, planning a test trajectory based on a lane boundary determined based on the first lane boundary determination scheme wherein the test trajectory is not used to drive the ADV;

planning the test trajectory for at least a threshold number of consecutive counts; and restoring the first lane boundary determination scheme as the current lane boundary determination scheme, in response to determining that the test trajectory satisfies the set of safety rules for at least the threshold number of consecutive counts.

2. The method of claim 1, further comprising designating the second lane boundary determination scheme as the current lane boundary determination scheme, such that during a second planning cycle subsequent to the first planning cycle, a subsequent trajectory for the ADV will be planned using a lane boundary determined based on the second lane boundary determination scheme.

3. The method of claim 1, wherein the first lane boundary scheme is based on a lane configuration of a current lane in which the ADV is located.

4. The method of claim 1, wherein the road has multiple lanes.

5. The method of claim 1, wherein if an emergency vehicle is present, all lanes are candidates used to plan a path to stop and park the ADV.

6. The method of claim 1, wherein determining whether the object is to move out of the first trajectory within the predetermined period of time is performed based on a moving history of the object sensed by the ADV.

7. The method of claim 1, wherein evaluating whether the first trajectory satisfies a set of safety rules comprises determining an emergency vehicle is within a predetermined proximity of the ADV.

8. The method of claim 1, wherein determining whether the test trajectory satisfies the set of safety rules for at least a threshold number of consecutive counts includes:

incrementing a count value of a counter while the first lane boundary determination scheme is not the current lane boundary determination scheme, in response to determining that the planning of the test trajectory satisfies the set of safety rules; and determining whether the count value of the counter is greater than the threshold number of consecutive counts, wherein the first lane boundary determination scheme is restored when the count value is greater than the threshold number of consecutive counts.

9. A non-transitory machine-readable medium having instructions stored therein, which when executed by a processor, cause the processor to perform operations, the operations comprising:

determining, during a first planning cycle, a first lane boundary of a driving environment perceived by an autonomous driving vehicle (ADV) using a first lane boundary determination scheme designated as a current lane boundary determination scheme;

planning a first trajectory based on the first lane boundary to drive the ADV navigating through the driving environment;

evaluating whether the first trajectory satisfies a set of safety rules to avoid a collision with an object detected in the driving environment, comprising determining that the object is blocking the first trajectory and determining whether the object is to move out of the first trajectory within a predetermined period of time, in response to determining that the object is not to move out of the first trajectory within the predetermined period of time, deeming that the first trajectory fails to satisfy the set of safety rules; and in response to determining that the first trajectory fails to satisfy the set of safety rules, determining a second lane boundary of the driving environment using a second lane boundary determination scheme which is based on a lane configuration of all lanes of a road in which the ADV is driving, and planning a second trajectory based on the second lane boundary;

controlling the ADV in accordance with the second trajectory;

during a second planning cycle subsequent to the first cycle, planning a test trajectory based on a lane boundary determined based on the first lane boundary determination scheme wherein the test trajectory is not used to drive the ADV;

planning the test trajectory for at least a threshold number of consecutive counts; and restoring the first lane boundary determination scheme as the current lane boundary determination scheme, in response to determining that the test trajectory satisfies the set of safety rules for at least the threshold number of consecutive counts.

10. The machine-readable medium of claim 9, wherein the operations further comprise designating the second lane boundary determination scheme as the current lane boundary determination scheme, such that during a second planning cycle subsequent to the first planning cycle, a subsequent trajectory for the ADV will be planned using a lane boundary determined based on the second lane boundary determination scheme.

11. The machine-readable medium of claim 9, wherein the first lane boundary scheme is based on a lane configuration of a current lane in which the ADV is located.

12. The machine-readable medium of claim 9, wherein the road has multiple lanes.

13. The machine-readable medium of claim 9, wherein if an emergency vehicle is present, all lanes are candidates used to plan a path to stop and park the ADV.

14. The machine-readable medium of claim 9, wherein determining whether the object is to move within the predetermined period of time is performed based on a moving history of the object sensed by the ADV.

15. The machine-readable medium of claim 9, wherein evaluating whether the first trajectory satisfies a set of safety rules comprises determining an emergency vehicle is within a predetermined proximity of the ADV.

16. The machine-readable medium of claim 9, wherein determining that the test trajectory satisfies the set of safety rules for at least the threshold number of consecutive counts includes:
   incrementing a count value of a counter while the first lane boundary determination scheme is not the current lane boundary determination scheme, in response to the planning of the test trajectory satisfying the set of safety rules; and
   determining whether the count value of the counter is greater than the threshold number of consecutive counts, wherein the first lane boundary determination scheme is restored when the count value is greater than the threshold number of consecutive counts.

17. A data processing system, comprising:
   a processor; and
   a memory coupled to the processor to store instructions, which when executed by the processor, cause the processor to perform operations, the operations including
      determining, during a first planning cycle, a first lane boundary of a driving environment perceived by an autonomous driving vehicle (ADV) using a first lane boundary determination scheme designated as a current lane boundary determination scheme,
      planning a first trajectory based on the first lane boundary to drive the ADV navigating through the driving environment,
      evaluating whether the first trajectory satisfies a set of safety rules to avoid a collision with an object detected in the driving environment, comprising determining that the object is blocking the first trajectory and determining whether the object is to move out of the first trajectory within a predetermined period of time,
      in response to determining that the object is not to move out of the first trajectory within the predetermined period of time, deeming that the first trajectory fails to satisfy the set of safety rules, and
      in response to determining that the first trajectory fails to satisfy the set of safety rules,
         determining a second lane boundary of the driving environment using a second lane boundary determination scheme, and
         planning a second trajectory based on the second lane boundary;
         controlling the ADV in accordance with the second trajectory;
      during a second planning cycle subsequent to the first cycle, planning a test trajectory based on a lane boundary determined based on the first lane boundary determination scheme wherein the test trajectory is not used to drive the ADV;
      planning the test trajectory for at least a threshold number of consecutive counts; and
      restoring the first lane boundary determination scheme as the current lane boundary determination scheme, in response to determining that the test trajectory satisfies the set of safety rules for at least the threshold number of consecutive counts.

18. The system of claim 17, wherein the operations further comprise designating the second lane boundary determination scheme as the current lane boundary determination scheme, such that during a second planning cycle subsequent to the first planning cycle, a subsequent trajectory for the ADV will be planned using a lane boundary determined based on the second lane boundary determination scheme.

* * * * *